United States Patent [19]
Becker et al.

[11] 4,369,053
[45] Jan. 18, 1983

[54] ARRANGEMENT FOR ADJUSTING THE MASS OF THERMOPLASTIC GOBS FOR A MOLDING MACHINE

[75] Inventors: Kurt Becker, Obernkirchen; Gerhard Geisel, Bückeburg; Siegfried Schwarzer, Stöckse; Hans-Georg Seidel, Rinteln, all of Fed. Rep. of Germany

[73] Assignee: Hermann Heye, Obernkirchen, Fed. Rep. of Germany

[21] Appl. No.: 312,852

[22] Filed: Oct. 19, 1981

[30] Foreign Application Priority Data

Oct. 29, 1980 [DE] Fed. Rep. of Germany ....... 3040762

[51] Int. Cl.³ .......................... C03B 7/08; C03B 7/14
[52] U.S. Cl. ..................... 65/164; 65/158; 65/330
[58] Field of Search .................. 65/158, 164, 330

[56] References Cited

U.S. PATENT DOCUMENTS

| | | | |
|---|---|---|---|
| 2,669,806 | 2/1954 | van de Walle et al. | 65/164 X |
| 2,950,571 | 8/1960 | Wythe | 65/164 |
| 3,180,718 | 4/1965 | Wilhelm | 65/158 |
| 3,192,027 | 6/1965 | Wilhelm | 65/158 |
| 3,502,457 | 3/1970 | Bublitz et al. | 65/158 X |
| 3,846,107 | 11/1974 | Foster et al. | 65/330 X |
| 3,874,866 | 4/1975 | Iacovazzi et al. | 65/330 X |

FOREIGN PATENT DOCUMENTS 631459  11/1978  U.S.S.R. ............ 65/164

*Primary Examiner*—Arthur D. Kellogg
*Attorney, Agent, or Firm*—Michael J. Striker

[57] ABSTRACT

An arrangement for adjusting the mass of gobs of thermoplastic material, especially molten glass, which are deformed in a positive manner in the mold of a molding machine by means of a pressing member which penetrates into the gobs. A distance transducer mechanically detects the maximum depth of penetration reached by the pressing member during each molding-machine operating cycle. The distance transducer is connected with a metallic actuating element for a differential transducer, at whose output is produced an electrical signal proportional to the maximum penetration depth reached, this signal being applied to an automatic regulating circuit which adjusts the setting of a dosing structure which controls the mass of the gobs. The regulating circuit includes, at the output of the differential transformer and connected one after the next, a measurement transducer, a maximum-value storage, a sample-and-hold circuit, a summing junction, a PI- or PID-regulator and an adjusting motor which drives an adjusting member for the dosing structure, as well as a feedback transducer. The feedback transducer is connected to the PI- or PID-regulator via a rotary-angle-to-voltage converter. A control and display panel is connected to a control logic circuit, the latter connected to the maximum-value storage and to the sample-and-hold circuit, the control logic circuit receiving a machine synchronization signal once per machine operating cycle. A desired-value potentiometer furnishes a desired-value voltage representing the optimum penetration depth for the pressing member, this voltage being applied to the summing junction. A weighting circuit can be provided to take into account the different maximum diameters of different pressing members which may from time to time be used. The feedback transducer is automatically returned to a middle angular setting thereof. The distance transducer can be constructed in several different ways, disclosed.

14 Claims, 10 Drawing Figures

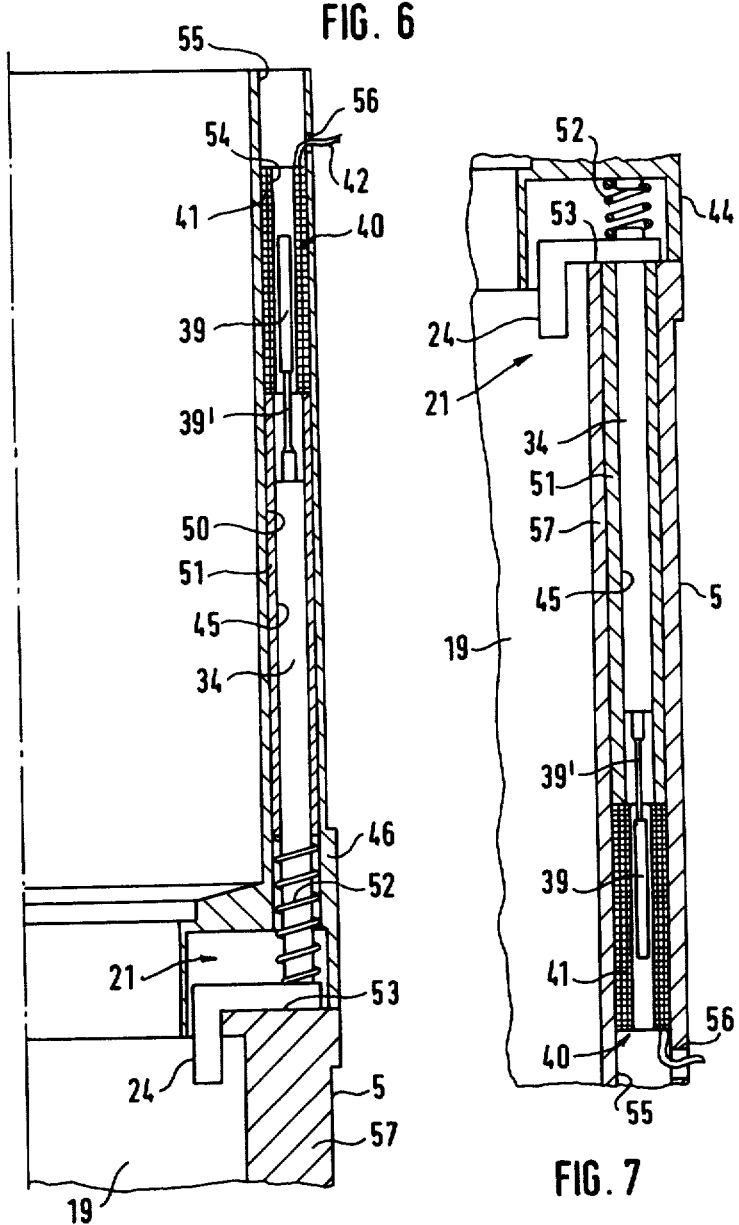

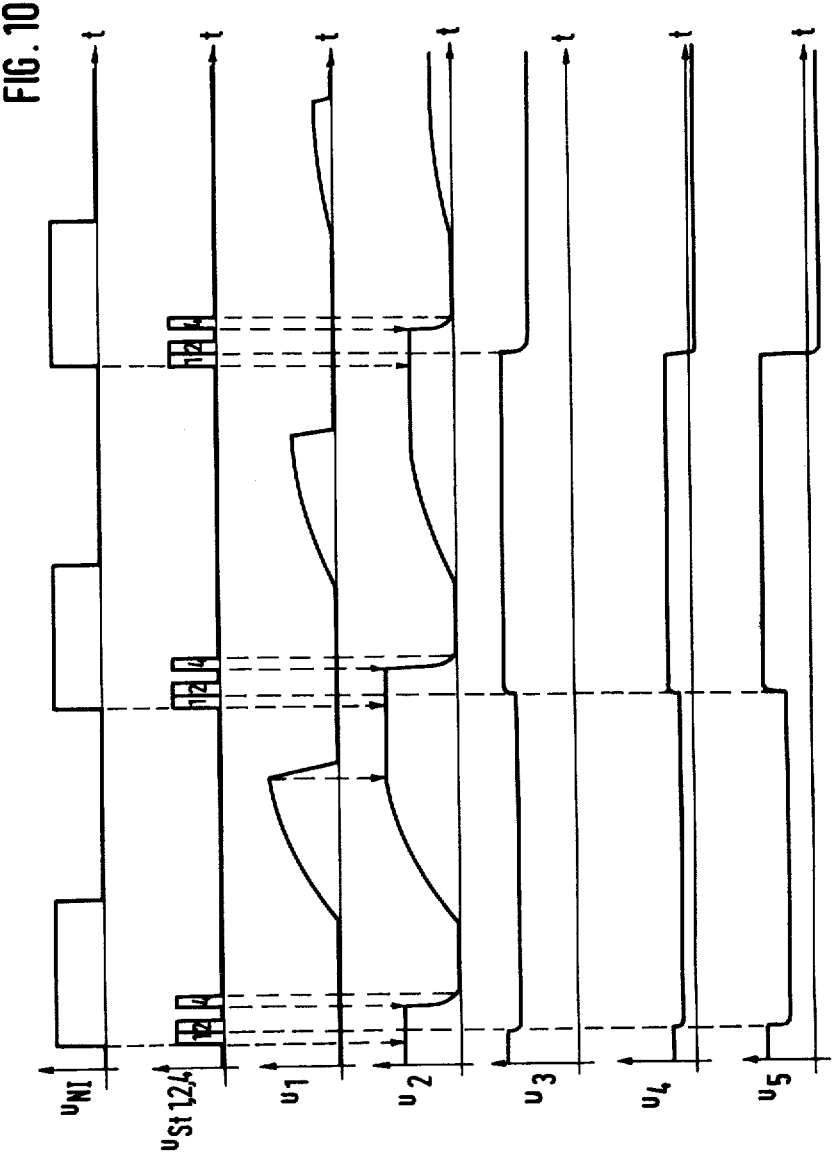

ced one after the other off a cord of such material issuing from a feeder, the gobs being fed into the mold of a molding machine and deformed in so-called positive manner by means of a pressing member which penetrates into the gobs. In such arrangements, the maximum penetration depth achieved by the pressing member during each molding-machine operating cycle is mechanically detected by a distance transducer, the latter being connected to a metallic actuating element for a differential transformer at whose output is produced an electrical signal proportional to the respective maximum penetration depth, the signal being applied to a regulating circuit for control of a dosing structure which adjusts the mass of the gobs.

U.S. Pat. No. 3,180,718, in FIGS. 8 and 9 thereof, discloses an arrangement of this type. In this arrangement, use is made of a differential transformer having a primary winding and two secondary windings. Each of these windings is embedded in a respective external peripheral groove of a stationary inlet pipe for the cooling air used to cool the pressing members, these inlet pipes being made of electrically insulating material. The pressing member is secured on a pipe-shaped piston rod made of metal, the free end of which surrounds the inlet pipe and serves as an actuating element. When the piston rod moves relative to the windings, the differential transformer produces a variable output signal which is proportional to the movement of the pressing member and which constitutes a measure both of this movement and also of the penetration depth of the pressing member. Such output signal is preferably displayed and/or recorded; additionally, however, this output signal is supposed to be used in the monitoring and/or control of the variables employed to monitor and/or control the size of the charged gobs. However, the publication in question discloses no details concerning how such monitoring or control action could be implemented.

In the older Federal Republic of Germany published patent application DE-OS No. 29 23 705, it is proposed, for I.S.-glass-forming machines, that one measure the end region of the distance through which moves the actuating piston of the pressing member or the piston rod of the actuating piston. The traversed distance is supposed to be detected by means of a measurement transducer and displayed. This is supposed to be made to occur, for example, by means of several electrical contacts arranged in the path of such movement, the electrical contacts being sensed or engaged one after the next. In the publication in question, mention is also made of the possibility of using the values detected by the measurement transducer for regulating the size of the glass gobs fed to the gathering mold, e.g. by displacement of the severing mechanism which severs the gobs from off the cord. However, details of such a regulating mechanism are not set forth.

SUMMARY OF THE INVENTION

It is a general object of the invention to provide a fast-reacting automatic regulating system which regulates the mass of successive gobs of thermoplastic material in dependence upon the maximum depth of penetration achieved by the pressing member during each molding-machine operating cycle.

In the preferred embodiment of the invention as disclosed herein, the regulating circuit includes a differential transformer whose output is connected to a measurement transducer whose output is connected to a maximum-valve storage, the output of which is connected to a sample-and-hold circuit. The output of the sample-and-hold circuit is connected via a summing junction to a PI- or PID-regulator, the output of the latter being connected to an adjusting motor which adjusts the dosing structure. The drive train between the adjusting motor and the adjusting member for the dosing structure is coupled to a feedback transducer to which there is connected a rotary-angle-to-voltage transducer whose output is connected to the PI- or PID-regulator. The arrangement furthermore includes a control and display panel connected to transmit control signals to and receive control signals from a control logic circuit, the control logic circuit having outputs connected to the maximum-value storage and to the sample-and-hold circuit. The control logic circuit has an input for receipt of a clock or synchronizing signal derived from the operating cycles of the molding machine, the control and display panel being connected to means providing a desired-value voltage representing the optimum penetration depth for the pressing member, the desired-value voltage being applied to the aforementioned summing junction.

During each molding-machine operating cycle, the pressing member is located only briefly in its setting of maximum depth of penetration, which depth is measured and then stored in the maximum-value storage. Of course, this stored maximum value is developed only during the last part of each machine operating cycle, and for this reason it is transferred into and stored by the sample-and-hold circuit, whereupon it remains steadily available up to the time when it is replaced by the next of the thusly developed maximum-penetration-depth signals. As soon as the maximum-penetration-depth signal has been transferred from the maximum-value storage to the sample-and-hold circuit, the maximum-value storage can be reset for development of the next such maximum-penetration-depth signal. In this way, there is produced during each molding-machine operating cycle a signal representing the maximum depth of penetration achieved by the pressing member, this signal causing, when the need exists, a correction of the setting of the dosing member immediately after performance of a pressing operation. Accordingly, deviations as between the masses of successive gobs, on the one hand, and, on the other hand, the preselected optimal gob mass value, are ascertained during the production process as early and as accurately as possible and, with simple means, eliminated or minimized. Advantageously, the dosing structure is provided in the form of a conventional dosing pipe, either a rotary pipe or a non-rotating pipe, which extends down partly immersed in the thermoplastic material, e.g. molten glass, present in the feeder for the machine mold. Normally, an annular gap exists between the lower edge of this pipe and the bottom of the feeder head, which bottom has one or plural through-openings for cords of issuing thermoplastic material, the annular gap serving to determine the rate of flow of the material to the at least one through-opening. Conventionally, there is furthermore provided in the interior of the pipe a so-called plunger which moves up and down during each molding-machine operating cycle. Such plunger likewise is immersed into the material and, by virtue of its oscillating motion, influences the outflow of the at least one cord from its associated feeder through-opening.

In accordance with a further feature of the invention, there is provided between the summing junction and the PI- or PID-regulator a weighting circuit providing a variable weighting factor which takes into account the different maximum diameters of different pressing members used with a molding machine, the weighting circuit being connected to the control and display panel. This feature is of particular advantage when changing over from one pressing member to another having a different maximum diameter. With the change in maximum diameter taken into account by the weighting circuit, it becomes unnecessary to readjust the whole of the regulating action of the PI- or PID-regulator after the latter has already been optimized for the previous pressing member.

According to another feature of the invention, the output of the sample-and-hold circuit and that of the desired-value potentiometer are each connected to an illuminated-bar display device. Likewise, advantageously, the output of the weighting circuit and the output of the rotary-angle-to-voltage converter are each connected to feed a respective recording track of a line recorder. This serves to provide the machine operator with displayed information concerning the state of machine operation and concerning important machine-operation parameters whose characteristics, trends, etc., become apparent during extended operation of the machine.

According to a further inventive feature, an electromagnetic coupling is connected between the drive train and the feedback transducer, the electromagnetic coupling being connected to and controlled by the control logic circuit. A return spring serves, when the electromagnetic coupling is in disengaged state, to return the feedback transducer to a middle setting thereof. Contacts responsive to end settings of the feedback transducer are electrically connected to the control logic circuit, and the control logic circuit has an output connected to the PI- or PID-regulator. This considerably facilitates the task of the machine operator. Thus, when the feedback transducer, and thus the regulating system as a whole, has reached a limit of its adjustment and regulating range, it is not necessary for the machine operator to manually switch off the machine's automatic regulator; likewise, it is not necessary for the machine operator to manually reset the feedback transducer to a middle setting thereof. Such new adjustments of the range of settings of the feedback transducer are indispensable in actual practice, on account of various disturbing effects which enter into system operation from time to time and also on account of wear in the area of the dosing structure.

According to another inventive feature, the drive train further includes an electromagnetic coupling between the adjusting motor and the adjusting member, this coupling being electrically connected to and controlled by the control logic circuit, and also a manually operated adjusting mechanism manually operable for control of the adjusting member, the control logic circuit having an output connected to the PI- or PID-regulator. This makes for a simple switchover from automatic regulation of gob mass to manual regulation thereof. The use of such electromagnetic coupling is particularly advantageous when a step-down transmission of relatively high step-down ratio is present in the drive train between the adjusting motor and the dosing structure.

According to another inventive feature, a limit value monitoring circuit is connected to the output of the maximum-value storage, and furthermore is connected to transmit control signals to and receive control signals from the control logic circuit, the control logic circuit having an output connected to the PI- or PID-regulator. This makes it possible quickly to detect and take into account the cases where the mass of the gob is either much too small, in the limit case zero, or else much too large. In the absence of this feature, i.e., if greatly excessive or greatly deficient gob mass were to be responded to by the automatic regulating system in the same manner as small deviation values, then in actual practice the system would implement excessive corrective movement of the dosing structure. However, with the use of the limit value monitoring circuit, such extreme cases are recognized as such and initiate an automatic changeover from the automatically regulated mode of charging control to the manually operated mode. As soon as the cause of the extreme gob mass excess or deficit has been corrected, the quickest possible return to automatically regulated gob mass control can then be implemented.

According to still another inventive concept, the control logic circuit has an input which receives a signal indicating whether or not at a predetermined time the mold is receiving a gob, the control logic circuit having an output connected to the PI- or PID-regulator. This serves automatically to effect a switchover from automatically regulated gob mass control to manual regulation so long as the machine's mold is in receipt of no gob at all. As soon as gobs are again being supplied, the signal just referred to ceases to be furnished, resulting in automatic reinstatement of automatic regulation of gob mass.

According to a further feature, the pressing member is secured on the piston rod of a piston slidably guided in a cylinder, the distance transducer including a sensing member connected to a slidably guided rod and being arranged in the path of movement of the piston rod or piston. The rod of the distance transducer is guided in an axially extending bore in a wall of the cylinder or in a structure connected with the cylinder. The sensing member projects into the interior space of the cylinder in a predetermined starting position in the end region of the path of motion of the piston rod or piston. The differential transformer has a coil structure arranged in a bore aligned with the aforementioned axially extending bore, such aligned bore being provided in the wall of the cylinder or in the structure connected with the cylinder. The actuating element of the differential transformer is a core connected to such rod and extending into the coil structure. This makes for a simple but very reliably performing distance transducer protected from external contamination and other influences. Its range of motion is no more than that required for reliable data collection. Also, the differential transformer and the actuating element thereof are protected and of a spacing-conserving design.

According to a further inventive aspect, the pressing member is secured on the piston rod of a piston slidably guided in a cylinder, and the distance transducer includes a slidably guided rod and a sensing member connected with such rod and arranged in the path of movement of the piston rod or piston, the sensing member having a sensing arm. The sensing member is mounted on a shaft which is swingable relative to the cylinder. An actuating arm secured on the swingable shaft is in operative engagement with the slidably guided rod of the distance transducer. The actuating element is a core, and the differential transformer includes a coil structure, the core being connected with the rod and extending into the coil structure. This alternative design for the distance transducer makes possible reliable transmission of distance information from a sensing location to a more distant location where such information is to be received.

For the distance transducer design just mentioned, a further feature includes the provision of a biasing arm secured to the swingably mounted shaft, a tension spring having one end connected to the biasing arm and another end connected to structure which is stationary relative to the cylinder, the tension spring maintaining a free end of the sensing arm in constant engagement with the piston rod. This serves to establish a definite starting position for the distance transducer.

According to a further inventive feature, the angular setting of the sensing arm and/or of the actuating arm and/or of the biasing arm are adjustable relative to the swingably mounted shaft. This allows important elements of the distance transducer assembly to be adjusted within required limits relative to their carrier shaft, so that the system may be readily adapted to new or changing operating conditions.

Biasing means may be provided to bias the rod into a starting position, the biasing means advantageously including a spring braced against the guide structure for the rod. This serves to establish a definite starting position for the rod of the distance transducer.

According to a further feature, the cylinder is secured on a carrier which is driven to and fro relative to the mold, the rod and the differential transformer being arranged on structure which is stationary relative to the molding machine in such a manner that a free end of the actuating arm is in engagement with the rod at the end of a stroke of movement of the carrier. This serves to assure that only the last portion of the movement of the pressing member in one particular direction will be utilized for actuation of the distance transducer. The carrier for the cylinder can, for example, be driven in a very precise fashion by a crank drive mechanism.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 6 depicts on a larger scale a detail of FIG. 5;

FIG. 7 depicts a detail corresponding to FIG. 6;

FIG. 10 is a pulse diagram pertaining to FIG. 8.

DESCRIPTION OF THE PREFERRED EMBODIMENTS

Figure 1:
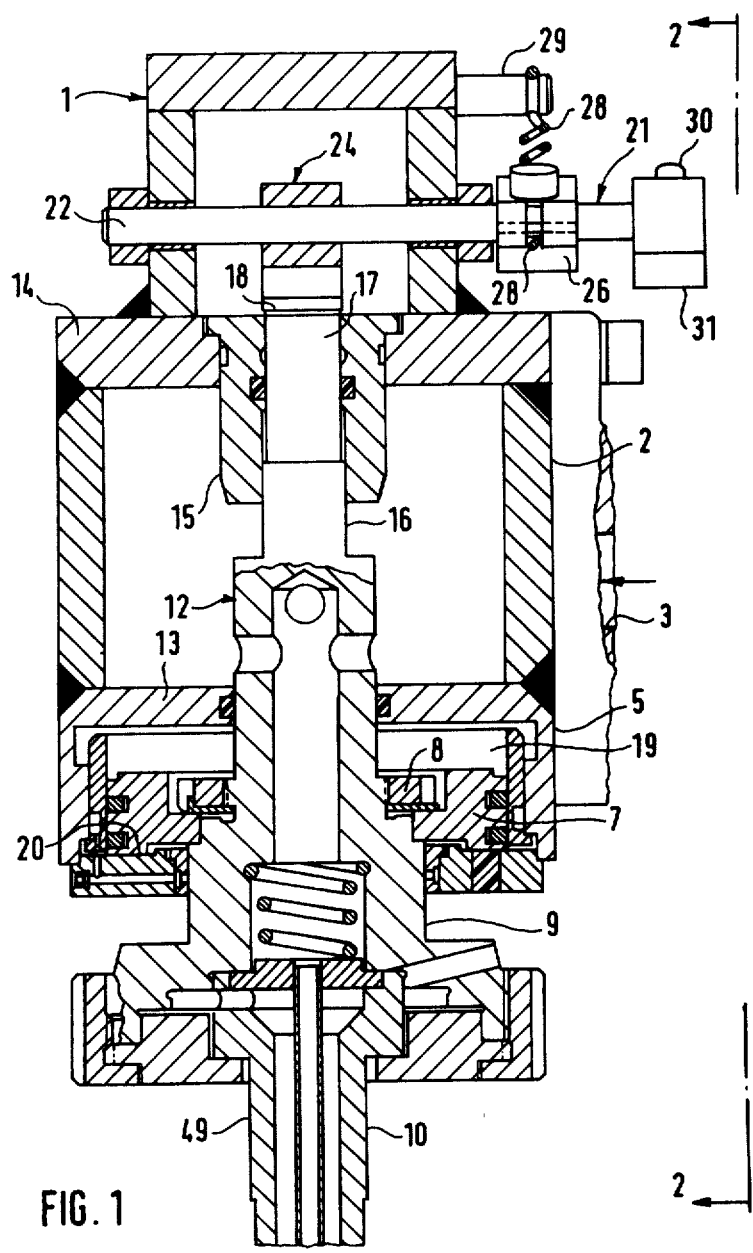
FIG. 1 is a longitudinal section through a part of a pressing plunger mechanism provided with a distance transducer.
Figure 2:
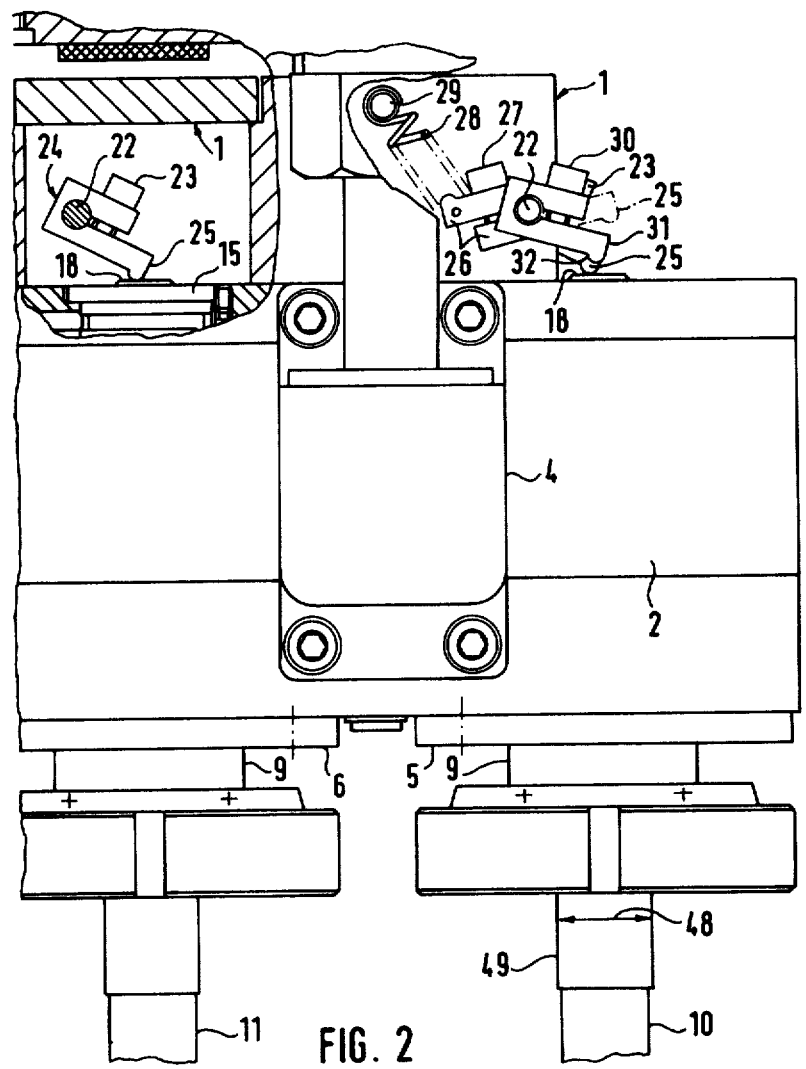
FIG. 2 is a view along line 2—2 of FIG. 1, partly sectioned.
Figure 3:
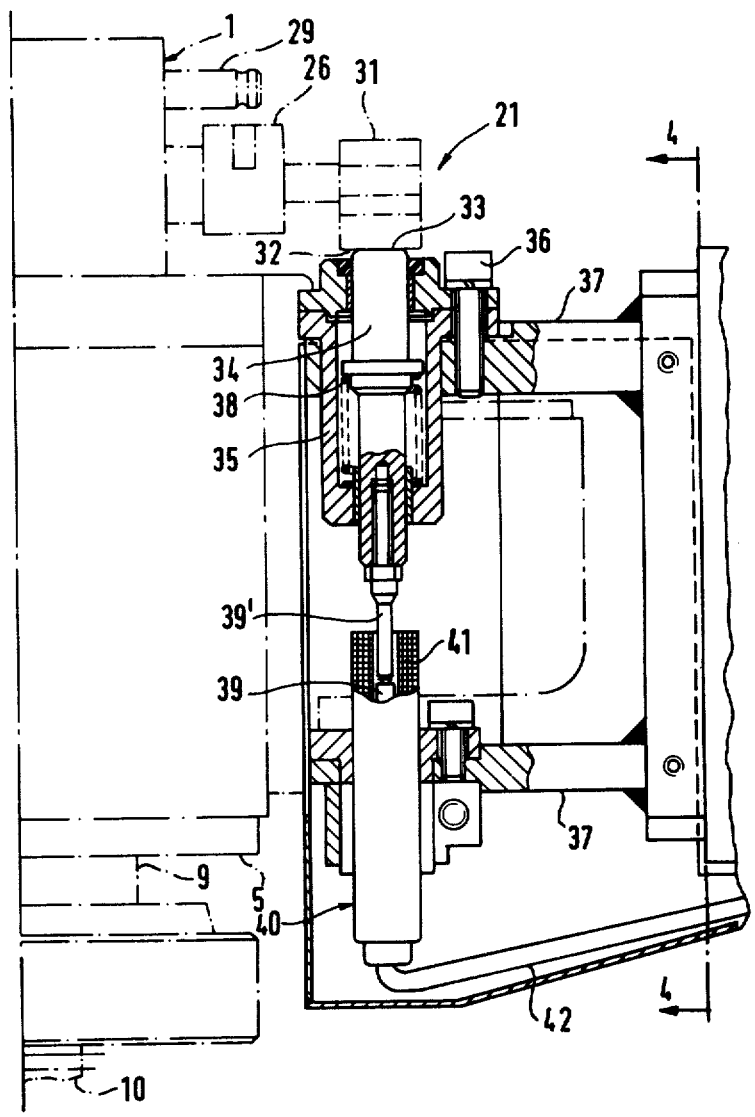
FIG. 3 is a longitudinal section through an auxiliary part of the distance transducer of FIG. 1, showing the associated differential transformer.
Figure 4:
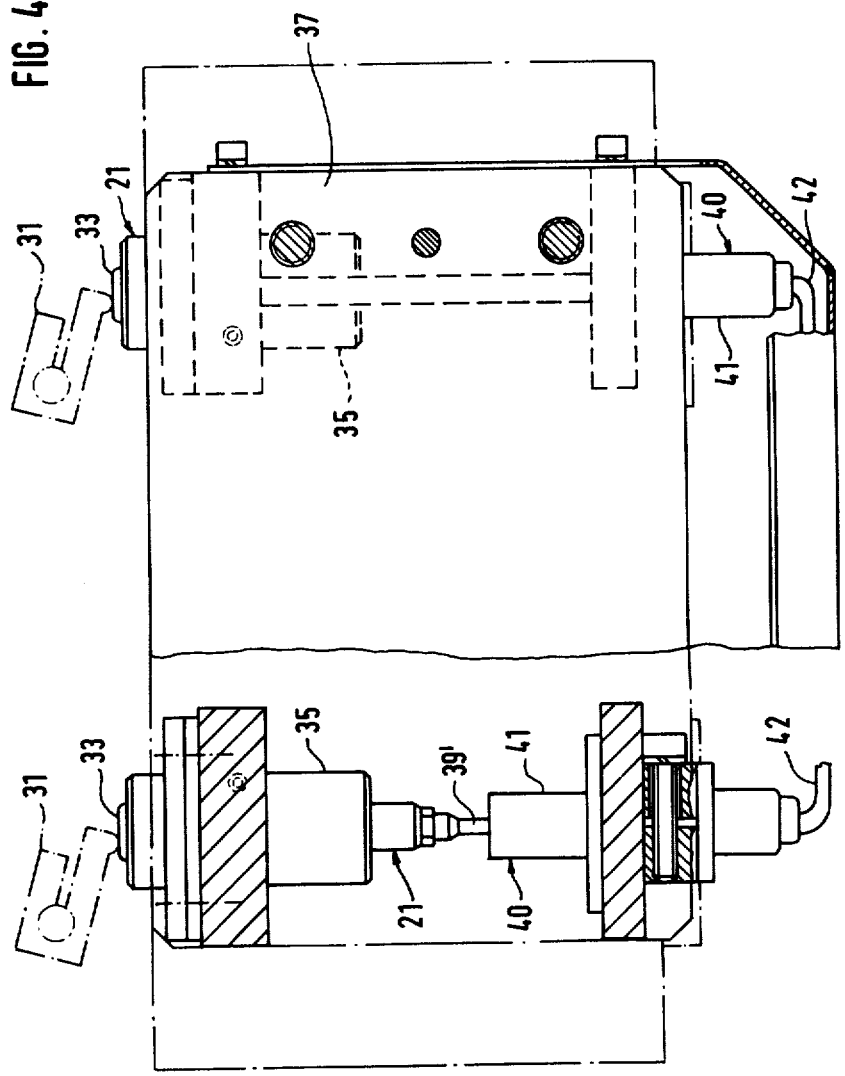
FIG. 4 is a sectional view taken along line 4—4 in FIG. 3.

In the embodiment depicted in FIGS. 1–4, a pressing plunger or member holder 1 is mounted for vertical movement in a non-illustrated guide structure and can be driven, by means of a non-illustrated crank drive, between a highest position illustrated in FIGS. 1 and 2 and a lowest position illustrated in dot-dash lines in FIGS. 3 and 4.

Welded to the underside of the pressing member holder 1 is a cooling-fluid box 2 into whose interior coolant fluid, e.g., cooling air, enters via an inlet opening 3 of an attachment piece 4.

Welded to the underside of the cooling-fluid box 2 are two cylinders 5 and 6 arranged spaced from each other and in each of which there is slidably guided a respective piston 7. A pressing member receiving element 9 is secured on the piston of cylinder 5 by means of a nut 8 and accommodates a pressing plunger or member 10.

A pressing plunger or member 11 is, in analogous manner, indirectly mounted on the piston 7 of the cylinder 6.

As the construction of the cylinders 5, 6, and of all the connecting elements right up to the pressing members 10, 11, are the same, only one of these two assemblies need be described.

The pressing member receiving element 9 is at its rear or top side shaped as a piston rod 12 slidably mounted at one part thereof in a separating wall 13 between the cooling fluid box 2 and the cylinder 5, and slidably mounted at another part thereof in a bushing 15 inserted into a cover plate or end wall 14 of the cooling fluid box 2. Piston rod 13 is prevented from rotating about its axis by provision of an intermediate portion 16 of non-circular cross-section and a corresponding cross-sectional bearing surface in the bushing 15. An end portion 17 of the piston rod 12 is of circular cross-section and with its end face 18 projects out upwardly clear of the bushing 15.

Pressing fluid is fed to the interior space 19 of cylinder 5 via a non-illustrated feed conduit and serves to effect pressing force limiting action at the pressing member 10.

The pressing members 10, 11 cooperate in a manner known per se with a non-illustrated double mold of a glass-forming machine, of the type operated in accordance with the press-blow method. In per se conventional manner, the press mold or gathering mold of the glass-forming machine is fed with a gob of molten glass from a supply unit during each operating cycle. As soon as the gob is located in the gathering mold, the pressing members 10, 11 penetrate into the gathering mold and displace the glass mass in the manner desired. The depth of penetration of the pressing member 10 or 11 into the gathering mold is established, in view of the incompressibility of the glass mass, in accordance with the volume of the glass gob present in the given instance. If this volume is less than an optimum volume value, the pressing member 10 or 11 travels down until it reaches its lower stopped position, shown in FIG. 1, in which the piston 7 abuts against a stop surface 20 of cylinder 5. In this case, the pressing member advances to too deep a position and thereby weakens the bottom of the parison being molded in the gathering mold; as a further result, the mouth of the parison is not fully pressed out. The consequence of this would be a defective hollow glass article, i.e. a reject.

In contrast, if the gob in the gathering mold has a volume in excess of the optimum glass volume, then certainly the interior space of the gathering mold becomes completely filled with the glass mass due to the penetration of the pressing member; however, in this case the pressing member cannot advance to its optimum deepest position. Thus, too large a glass volume can also lead to defective articles. Accordingly, it becomes necessary to optimize the glass volume which the gob has at the time of molding. The tolerance range for the glass volume amounts to, e.g. ±1-2% of the optimal value.

FIGS. 1-4 depict the provision of means for mechanically detecting the maximum penetration depth of the pressing member 10 or 11 into its associated gathering mold in any particular instance. To this end there is provided a distance transducer 21 including a shaft 22 swingably mounted on the pressing member holder 1. Shaft 22 carries a sensing member 24 which, by means of a screw 23, can be arrested in any desired angular position relative to the shaft 22. The sensing member 24 has a sensing arm 25 which is in constant contact with the end face 18 of the piston rod 12. This is made possible by a biasing arm 26 which, by means of a screw 27, can be arrested in any desired angular position on the shaft 22. Connected to the free end of biasing arm 26 is one end of a tension spring 28 whose other end is connected to a spring bolt 29 of the pressing member holder 1.

Further out on the shaft 22, an actuator arm 31 can be arrested, by means of a screw 30, at any desired angular position relative to the shaft 22.

In contrast to FIG. 1, FIG. 3 shows the pressing member holder 1, with all the elements carried thereon, in its lowermost position, corresponding to the lower dead point of the aforementioned, non-illustrated crank drive. In this position, the actuator arm 31 bears with its free end 32 upon the end face 33 of an axially movable rod 34 of the distance transducer 21. Rod 34 is guided in a housing 35 secured by means of screws 36 to a bracket 37 fixedly mounted on a stationary part of the glass-forming machine. The rod 34 is biased to an upper starting position by a compression spring 38 braced against the housing 35; in this position the aforementioned contact between the free end 32 of the actuator arm 31 and the end face 33 is established. This starting position is depicted in FIG. 3.

A non-magnetizable core carrier 39' for a magnetizable core 39 of a differential transformer 40 is screwed into the lower end of the rod 34. Core 39 extends into a coil structure 41 of the differential transformer 40. Coil structure 41 together with a housing therefor is mounted axially adjustable on the bracket 37.

Further details of the construction of the two distance transducers 21 and of the associated differential transformers 40 are depicted in FIG. 4.

In FIGS. 3 and 4, each differential transformer 40 is shown connected to a connecting cable 42.

Figure 5:
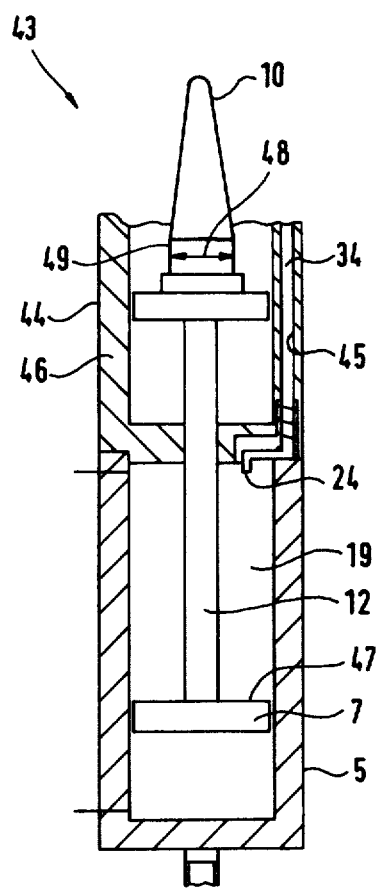
FIG. 5 is a schematic longitudinal section through another plunger mechanism provided with a distance transducer and differential transformer.

FIGS. 5 and 6 depict another embodiment, namely a pressing member mechanism 43 of a so-called I.S.-glass forming machine. Components in FIGS. 5 and 6 which are the same as components already described are identified by reference numerals the same as those already employed.

As shown in FIG. 5, there is attached to the cylinder 5 an axially adjoining guide cylinder 44 for the pressing member 10. Rod 34 is guided in an axially extending bore 45 in a wall 46 of the guide cylinder 44. The sensing member 24 is in this case fixedly connected to the rod 34 and projects into the interior space 19 of cylinder 5. At one end of the range of penetration movement of the piston 7 the latter, at an actuating surface 47 thereof, comes into contact with the free end of the actuator member 24 and pushes the latter, along with the rod 34, the core carrier 39' and the core 39, upwards, as depicted in FIG. 5, relative to the coil structure 41. This relative movement between core 39 and the coil structure 41 continues until the pressing member 10 has reached its deepest position within the non-illustrated mold of the glass-forming machine.

As was also the case in the embodiment of FIGS. 1-4, the molding tool surrounds in conventional manner a mold opening with an opening in the region of a non-illustrated neck mold. The diameter of this opening corresponds in conventional manner to a maximum diameter 48 of the pressing member 10, the pressing member 10 normally having such maximum diameter in a cylindrical starting region 49. Thus, if the optimum glass mass or more than such optimum glass mass is present in the mold cavity of the mold, then the mold cavity is fully filled up, i.e. a degree of filing of 100% is reached. If the optimum glass mass is present in the mold cavity, the pressing member, upon its penetration, reaches its optimum deepest position. In contrast, if more than the optimum glass mass is present in the mold cavity, the pressing member cannot penetrate all the way to its optimum deepest position, because the excess of glass cannot escape out of the closed mold cavity. In both cases a so-called "positive" deformation of the glass is understood. This can fail to occur only if there is present in the mold cavity so small a glass mass that, even when the pressing member has penetrated into the mold to a maximum possible penetration depth defined by a stop member, the degree of filling of glass in the mold cavity is still less than 100%.

In FIG. 6 the bore 45 is defined by a bushing 51 secured in a receiving bore 50 of the wall 46. A compression spring 52 is at one end thereof braced against the lower end face of the bushing 51 and at its other end braced against the sensing member 24. Spring 52 biases the sensing member 24 into a starting position of the latter, shown in FIG. 6, and delimited by a stop member 53 of the cylinder 5.

The core carrier 39' is made of brass and is screwed into the rod 34. As shown in FIG. 6, core carrier 39' carries at its upper end the magnetizable core 9, which latter extends into an axial bore 54 in the coil structure 41. Coil structure 41 is secured in a bore 55 in the wall 46, bore 55 being in alignment with the bore 45. The electrical connection cable 42 is led out through a transverse bore 56 in the wall 46.

FIG. 7 depicts a modification of FIGS. 5 and 6, to the extent that in FIG. 7 the bores 45, 55 and 56, as well as the elements contained therein, are arranged not in the wall 46 of the guide cylinder 44 but instead in a wall 57 of the cylinder 5.

Figure 8:
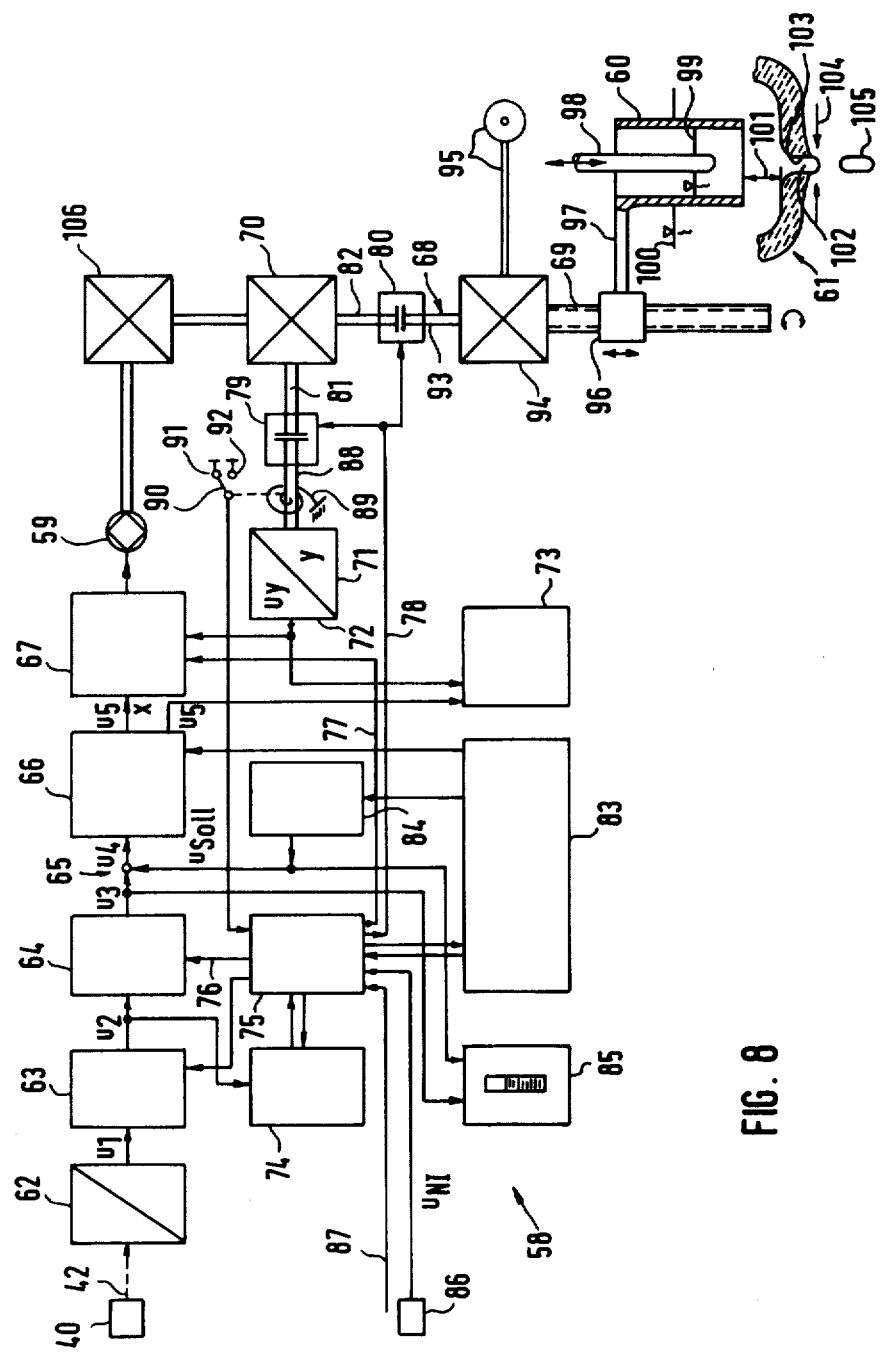
FIG. 8 is a block circuit diagram of a regulating circuit for adjusting a dosing structure.

FIG. 8 depicts a block circuit diagram of a regulating circuit 58 which is connected, via the electrical connection cable 42, to the differential transformer 40. Regulating circuit 58 regulates an adjusting motor 59, which latter, in a manner described below, adjusts the height of a pipe-like dosing element 60 relative to a gob feeder 61.

In regulating circuit 58, the connection cable 42 leads to a transducer or converter 62, which latter is connected to a maximum-value storage stage 63. The latter is connected with a sample-and-hold circuit 64, and circuit 64 is connected via summing junction 65 to a weighting circuit 66 for the diameter of the respective one of the pressing members 10, 11. Weighting circuit 66 is connected to a PID-regulator 67 having an integrated amplifier, whose output is connected to the adjusting motor 59. A drive train 68 between the adjusting motor 59 and a spindle serving as the adjusting member 69 for the dosing element 60 is coupled, via a bevel-gear gearing unit 70, to a feedback transducer 71, the latter being connected to a rotary-angle-to-voltage converter 72 whose output is connected, on the one hand, to the PID-regulator 67 and, on the other hand, to a line recorder 73. The weighting circuit 66 is also connected to the line recorder 73.

The output of maximum-value storage 63 is furthermore connected with a limit value monitoring stage 74, which in turn is connected to a control logic stage 75 for transmission of signals of data from stage 74 to stage 75, and also from stage 75 to stage 74. One output line of control logic stage 75 is connected to the maximum-value storage 63, a further output 76 is connected to the sample-and-hold stage 64, and further outputs 77 and 78 are respectively connected to the PID-regulator 67 and to electromagnetic couplings 79 and 80, which latter are connected to output shafts 81 and 82 of the bevel-gearing unit 70.

A control and display panel unit 83 is connected to control logic stage 75, for transmission of data thereto and reception of data therefrom, and is further connected to the weighting circuit 66 and to a desired-value potentiometer 84, which latter is connected to the summing junction 65 and to an illuminated-bar display device 85.

As soon as possible after the pressing member 10 or 11 has reached and then begun to leave its position of maximum penetration depth, a proximity initiator 86 transmits to the control logic stage 75 a voltage signal $u_{NI}$ which comprises an operating-cycle clock or synchronizing signal. Control logic stage 75 furthermore receives, via a line 87, signals which indicate whether the mold at a particular point in time is being fed with a gob 105 or not. If for whatever reason such charging is not taking place, the control logic stage 75, via the output line 77 thereof, renders the PID-regulator 67 inactive, the automatic regulating action is interrupted, and the system thus switched over for manual operation. The adjusting motor 59 in such case does not move, and, via the output line 78, the electromagnetic couplings 79 and 80 are disengaged. As soon as the presence of a gob 105 is again detected, however, the system is automatically switched back to its automatically regulated mode of operation.

A shaft 88 which couples the electromagnetic coupling 79 to the feedback transducer 71 has connected to it a return spring 89 which, when the electromagnetic coupling 79 is in disengaged state, always returns the feedback transducer 71 to a middle setting thereof. Feedback transducer 71 has, for example, a 100° range of angular settings, so that the resetting of transducer 71 by return spring 89 resets the transducer to a setting 50° displaced from one of its end settings. A moving contact 90 is mechanically coupled to shaft 88 and engages one or the other of two stationary end-position contacts 91, 92 when the feedback transducer 71 has reached one or the other end of its range of angular settings.

Electromagnetic coupling 80 has an output shaft 93 which is connected, via a bevel-gear transmission, to the adjusting spindle 69. When the electromagnetic coupling 80 is in disengaged state, the rotary setting of the adjusting spindle 69 can be changed by means of a manually operated adjusting member 95. A spindle nut 96 threadingly carried on adjusting spindle 69 shifts in one or the other direction along the length of spindle 69, this shifting motion being transmitted via an arm 97 to the dosing element 60.

A plunger 98 in the interior of the dosing element 60 moves down once and then back up once during the course of each operating cycle, as indicated by the double-headed arrow. Inside the dosing element 60 the molten glass extends up to an upper-glass-surface level 99, which normally is somewhat lower than the level 100 of the upper surface of the molten glass which surrounds the dosing element 60. Between the bottom edge of dosing element 60 and a cooperating opposite surface of feeder 61 there is formed an annular gap of height 101, height 101 being increased or decreased by rotation of adjustment spindle 69 in one or the opposite direction. Height 101 can also be made zero when emergence of a molten-glass cord 102 from the through-opening 103 of the feeder 61 is to be prevented. Normally, however, the cord 102 is permitted to exit from through-opening 103 and is severed by a severing unit 104, indicated schematically by arrows pointing towards each other, to form successive gobs 105.

The drive train 68 furthermore includes a stepdown transmission 106 having a reduction ratio of e.g. 100:1, which makes necessary the disengagement of the electromagnetic coupling 80 for actuation of the manual adjustment device 95 to be able to take place.

The PID-regulator 67 can, for example, be a "Protronic" regulator of the type TK produced by the firm Hartmann & Braun AG Mess- und Regeltechnik, Post Office Box 90 05 07, 6000 Frankfurt am Main 90, Federal Republic of Germany, available in the United States from Esterline Angus Instrument Corporation, 1201 Main Street, Indianapolis, Indiana 46224, or from EPIC Inc., 150 Nassau Street, New York, N.Y. This "Protronic" TK controller is described in the Hartmann & Braun owner's manual designated 42/62 -38-2 XB, carrying a publication code number 5.79/Hbg./3.2.1/639. This regulator can be supplied as either a PI-regulator or as a PID-regulator.

Figure 9:
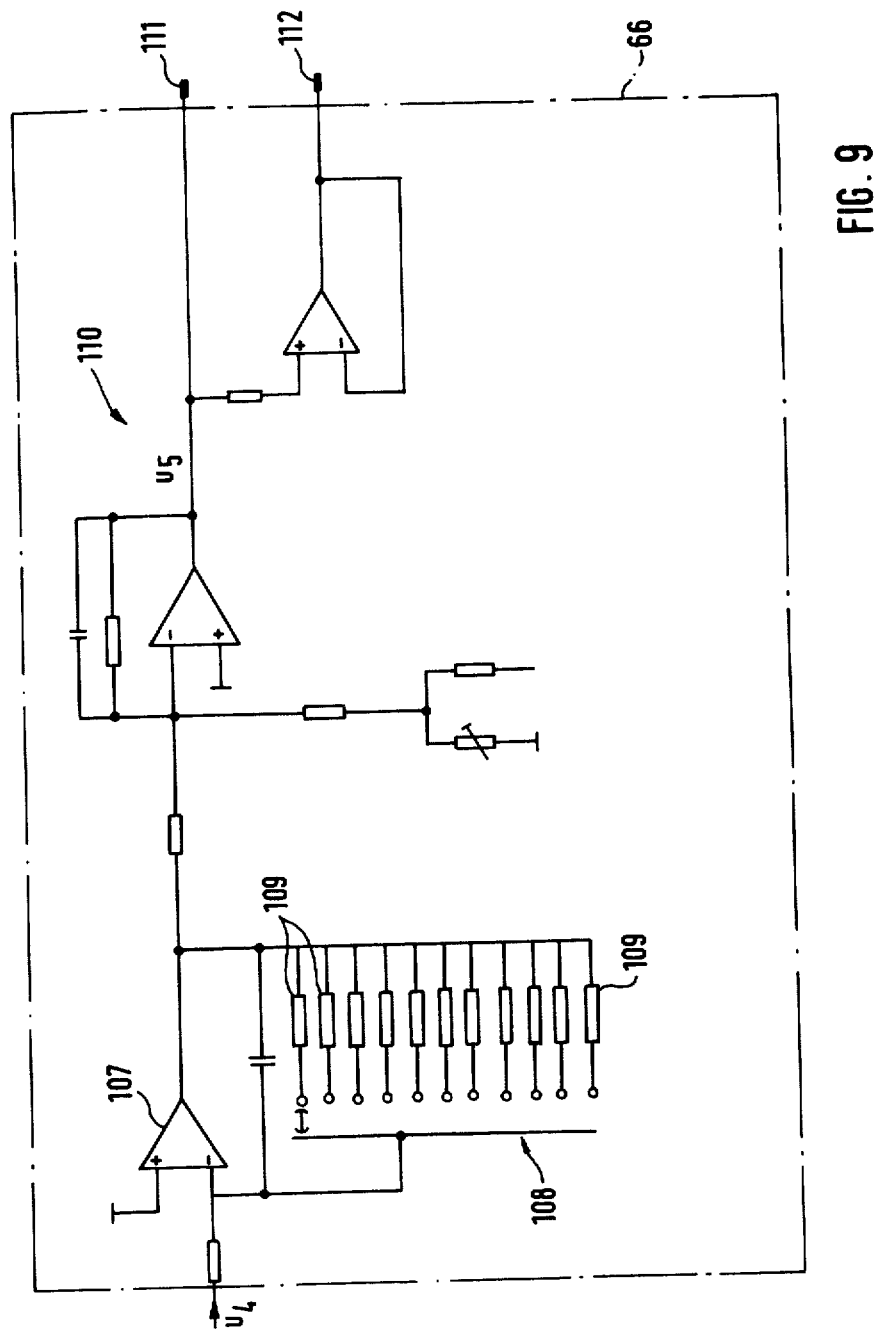
FIG. 9 depicts details of the weighting circuit of FIG. 8.

FIG. 9 depicts details of the internal configuration of the weighting circuit 66. Weighting circuit 66 includes an amplifier 107 whose output is connected to the inverting input thereof via a feedback branch which here has the form of a multi-step switch 108. The contacts of multi-step switch 108 are connected to respective ones of a set of resistors 109, having different respective resistance values. The individual resistance values of the resistors 109 correspond to respective values of the maximum diameter 48 of the cylindrical starting region 49 of an associated pressing member 10 or 11. The output of amplifier 107 transmits signals, via a matching circuit 110, to an output 111 which leads to the PID-regulator 67, and also to an output 112 which leads to the line recorder 73.

FIG. 10 depicts various circuit voltages versus time which characterize the operation of the illustrated circuitry.

Voltage $u_{NI}$ constitutes the clock or synchronizing signal derived from the working cycles of the actual production process. For this purpose, proximity initiator 86 can for example be activated by the opening of a non-illustrated mold tong when the pressing member 10 or 11 has reached its setting of maximum penetration depth, just left the same and commenced its return stroke. Alternatively, voltage $u_{NI}$ can be directly derived from suitable control signals anyway produced by the molding machine's electronic control system. The voltage $u_1$ produced by measurement transducer 62 is proportional to the setting of the core 39 of the differential transformer 40. Voltage $u_2$ produced at the output of the maximum-value storage 63 is equal to $u_1$max and retains its value until the appearance of a control signal $u_{St4}$ produced by the control logic stage 75 and transmitted via the line between stage 75 and the maximum-value storage 63. From that point on the voltage $u_2$ at the output of the maximum-value storage is erased or reset. Voltage $u_3$ is present at the output of the sample-and-hold circuit 64. The value of $u_2$ is transferred upon the appearance of a control signal received via the output line 76 (FIG. 8) and this value is held until a new value of $u_2$ is transferred during the next cycle of operation.

The voltage $u_4$ is present at the summing junction 65. It is the difference $u_3 - u_{So11}$, i.e., the difference between $u_3$ and the desired-value voltage. The magnitude of voltage $u_4$ represents the difference between the actual depth of penetration of the pressing member 10 or 11, on the one hand, and, on the other hand, the correct or desired depth of penetration, and the polarity of voltage $u_4$ indicates the sense of this difference.

The voltage $u_5$ constitutes the weighted mass deviation resulting from the pressing member's setting deviation. Voltage $u_5$ is thus a weighted version of the voltage $u_4$, $u_4$ being multiplied by a constant K of dimension l/g. Constant K is varied by variation of the gain of the weighting circuit 66 in proportion to the square of the value in any given instance of the maximum diameter 48 of the pressing member 10 or 11, so that the voltage $u_5$ is applied to the PID-regulator 67 as an input quantity which has been normalized to be independent of the largest diameter value of the pressing member 10 or 11, for example by lV/g. In this way, the regulating action implemented by the PID-regulator 67 need be adjusted only once to establish an optimum action for the regulating system, whereafter the use of pressing members of different maximum diameter values will require no re-optimization of the regulating action implemented by regulator 67. The same applies to the line recorder 73 which records the mass error or deviation in one track along a calibrated and normalized scale.

So long as a control signal $U_{St1}$ produced by control logic circuit 75 is present, the limit value monitoring circuit 74 evaluates the voltage $u_2$ with respect to whether voltage $u_2$ falls below or exceeds preselected values. If voltage $u_2$ falls below a preselected value or exceeds a preselected value, the control signal $u_{St2}$ in the control logic stage 75 is suppressed, as a result of which the new value of $u_2$ is not transferred into the sample-and-hold circuit 64. Simultaneously, the control logic stage 75 causes an, e.g. acoustic or optical, alarm to be issued from the control and display panel 83; additionally, control logic stage 75, via output line 77 thereof, causes the PID-regulator 67 to be switched over into the manual-operation mode and, via output line 78, causes the electromagnetic couplings 79 and 80 to become disengaged. Voltage $u_2$ falls below the limit values preset on the limit value monitoring circuit 74 when much too much glass is present in the mold. This happens, for example, when, quite undesirably, a residual mass of glass left over from the preceding machine operating cycle has remained in the mold and the new gob 105 is deposited atop it. In contrast, voltage $u_2$ exceeds the limit values preset on the limit value monitoring circuit 74 especially when no gob 105 at all is charged into the mold. A non-illustrated switch provided on the control and display panel 83 can be operated to return the system to its automatically regulated mode of operation.

The sequence of control signals or pulses $u_{St1}$, $u_{St2}$, $u_{St4}$ is initiated by the clocking or synchronizing signal $u_{NI}$, and the constituent pulses are produced in the control logic stage 75 by means, for example, of a decimal counter.

It will be understood that each of the elements described above, or two or more together, may also find a useful application in other types of constructions and circuit configurations differing from the types described above.

While the invention has been illustrated and described as embodied in a system for automatically regulating the masses of the gobs fed into the molds of a molding machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for adjusting the mass of gobs of thermoplastic material, especially molten glass, which are severed one after the other off a cord of the material issuing from a feeder, fed into the mold of a molding machine and by means of a pressing member which penetrates into the gobs deformed in a positive manner, with the maximum penetration depth achieved by the pressing member during each operating cycle being mechanically detected by a distance transducer, the distance transducer being connected to a metallic actuating element for a differential transformer at whose output is produced an electrical signal which is proportional to such respective maximum penetration depth and which is applied to a regulating circuit for control of a dosing structure which adjusts the mass of the gobs, characterized in that, in the regulating circuit an output of the differential transformer is connected to a measurement transducer whose output is connected to a maximum-value storage, the output of the latter being connected to a sample-and-hold circuit whose output is connected via a summing junction to a PI- or PID-regulator, the output of the latter being connected to an adjusting motor which adjusts the dosing structure, furthermore including a drive train between the adjusting motor and an adjusting member for the dosing structure, the drive train being connected to a feedback transducer to which there is connected a rotary-angle-to-voltage transducer whose output is connected to the PI- or PID-regulator, the arrangement furthermore including a control and display panel connected to transmit signals to and receive signals from a control logic circuit, the control logic circuit having outputs connected to the maximum-value storage and to the sample-and-hold circuit, the control logic circuit having an input for receipt of a synchronizing signal derived from the operating cycles of a molding machine, the control and display panel being connected to means providing a desired-value voltage representing the optimum penetration depth for the pressing member, the desired-value voltage being applied to the summing junction.

2. The arrangement set forth in claim 1, furthermore including between the summing junction and the PI- or PID-regulator a weighting circuit providing a variable weighting factor which takes into account the different maximum diameters of different pressing members used with a molding machine, the weighting circuit being connected to the control and display panel.

3. The arrangement set forth in claim 1, further including illuminated-bar display means connected to the output of the sample-and-hold circuit and to the output of the desired-value potentiometer.

4. The arrangement set forth in claim 2, further including a line recorder having inputs for respective recording-line tracks connected to the output of the weighting circuit and to the output of the rotary-angle-to-voltage converter.

5. The arrangement set forth in claim 1, furthermore including an electromagnetic coupling connected between the drive train and the feedback transducer, the electromagnetic coupling being connected to and controlled by the control logic circuit, return spring means which when the electromagnetic coupling is in disengaged state returns the feedback transducer to a middle setting thereof, contacts responsive to end settings of the feedback transducer and electrically connected to the control logic circuit, the control logic circuit having an output connected to the PI- or PID-regulator.

6. The arrangement set forth in claim 1, the drive train furthermore including between the adjusting motor and the adjusting member an electromagnetic coupling electrically connected to and controlled by the control logic circuit, and a manually operated adjusting mechanism manually operable for control of the adjusting member, the control logic circuit having an output connected to the PI- or PID-regulator.

7. The arrangement set forth in claim 1, furthermore including a limit value monitoring circuit connected to the output of the maximum-value storage, the limit value monitoring circuit being connected to transmit control signals to and receive control signals from the control logic circuit, the control logic circuit having an output connected to the PI- or PID-regulator.

8. The arrangement set forth in claim 1, the control logic circuit having an input for receipt of a signal which indicates whether at a predetermined time the mold of the machine is or is not receiving a gob, the control logic circuit having an output connected to the PI- or PID-regulator.

9. The arrangement set forth in claim 1, the pressing member being secured on the piston rod of a piston slidably guided in a cylinder, the distance transducer including a sensing member connected to a slidably guided rod, the sensing member being arranged in the path of movement of the piston rod or of the piston, the rod of the distance transducer being guided in an axially extending bore in a wall of the cylinder or of structure connected with the cylinder, the sensing member projecting into the interior space of the cylinder in a predetermined starting position in the end region of the path of motion of the piston rod or piston, a coil structure of the differential transformer being arranged in a bore aligned with the axially extending bore, such aligned bore being provided in the wall of the cylinder or in the structure connected with the cylinder, the actuating element of the differential transformer being a core connected to the rod and extending into the coil structure.

10. The arrangement set forth in claim 1, the pressing member being secured on the piston rod of a piston slidably guided in a cylinder, the distance transducer including a slidably guided rod and a sensing member connected with the slidably guided rod and arranged in the path of movement of the piston rod or the piston, the sensing member having a sensing arm, further including a shaft mounted swingably relative to the cylinder, the sensing member being mounted on the swingably mounted shaft, an actuating arm secured on the swingably mounted shaft in operative engagement with the slidably guided rod of the distance transducer, the actuating element being a core, the differential transformer including a coil structure, the core being connected with the rod and extending into the coil structure.

11. The arrangement set forth in claim 10, further including a biasing arm secured to the swingably mounted shaft, a tension spring having one end connected to the biasing arm and another end connected to structure which is stationary relative to the cylinder, the tension spring maintaining a free end of the sensing arm in constant engagement with the piston rod.

12. The arrangement set forth in claim 11, the angular setting of the sensing arm and/or of the actuating arm and/or of the biasing arm being adjustable relative to the swingably mounted shaft.

13. The arrangement set forth in claim 10, furthermore including biasing means biasing the rod into a starting position, the biasing means including a spring braced against the guide structure for the rod.

14. The arrangement set forth in claim 10, the cylinder being secured on a carrier which is movable to and fro relative to the mold, the rod and the differential transformer being arranged on structure which is stationary relative to the molding machine in such a manner that a free end of the actuating arm is in engagement with the rod at the end of a stroke of movement of the carrier.

* * * * *